(12) United States Patent
Fuerst

(10) Patent No.: US 7,762,012 B2
(45) Date of Patent: *Jul. 27, 2010

(54) FOOTWEAR WITH MULTI-PIECE MIDSOLE

(75) Inventor: Rory W. Fuerst, Atherton, CA (US)

(73) Assignee: Keen, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/862,428

(22) Filed: Sep. 27, 2007

(65) Prior Publication Data

US 2008/0010855 A1    Jan. 17, 2008

Related U.S. Application Data

(62) Division of application No. 11/148,701, filed on Jun. 8, 2005, now Pat. No. 7,290,356.

(60) Provisional application No. 60/578,328, filed on Jun. 8, 2004.

(51) Int. Cl.
*A43C 13/14*    (2006.01)
*A43B 13/12*    (2006.01)

(52) U.S. Cl. ................ 36/77 R; 36/30 R; 36/102

(58) Field of Classification Search ........... 36/77 R, 36/30 R, 102, 103
See application file for complete search history.

(56) References Cited

U.S. PATENT DOCUMENTS

| | | | |
|---|---|---|---|
| 114,340 A | 5/1871 | Prusha et al. | |
| 900,881 A | 10/1908 | Parker | |
| 1,053,442 A | 2/1913 | Rouse | |
| 1,205,983 A | 11/1916 | Emmerth | |
| 1,386,028 A | 8/1921 | Roe | |
| D77,029 S | 11/1928 | Richter et al. | |
| 1,769,328 A | 7/1930 | Auster | |
| 1,773,127 A | 8/1930 | Auster | |
| 1,803,554 A | 5/1931 | Knilans | |
| 1,964,705 A | 6/1934 | Pellhofer | |
| 2,093,908 A | 9/1937 | Dodge | |
| 2,110,839 A | 3/1938 | Ferriot | |
| 2,185,762 A | 1/1940 | Cox | |
| 2,193,943 A | 3/1940 | Shea | |
| 2,229,387 A | 1/1941 | Parker | |
| 2,239,206 A | 4/1941 | Tietig | |
| 2,283,273 A | 5/1942 | Marcy | |
| 2,297,595 A | 9/1942 | Weinstat | |
| 2,317,870 A | 4/1943 | Weinstat | |
| 2,327,322 A | 8/1943 | Slater | |
| 2,468,573 A | 4/1949 | Rimer | |
| D158,653 S | 5/1950 | Fenlason | |

(Continued)

FOREIGN PATENT DOCUMENTS

DE    3940522    6/1991

(Continued)

*Primary Examiner*—Ted Kavanaugh
(74) *Attorney, Agent, or Firm*—Alleman Hall McCoy Russell & Tuttle LLP

(57) ABSTRACT

Articles of footwear having a unitary midsole with an integrally molded toe cap that extends over the wearer's toes are disclosed, in which the midsole is molded in multiple sections one of which includes the integrally-molded toe cap which are joined to one another to provide the unitary midsole.

10 Claims, 2 Drawing Sheets

U.S. PATENT DOCUMENTS

| | | | |
|---|---|---|---|
| 2,583,826 A | 1/1952 | Fischer | |
| 2,590,648 A | 3/1952 | Pitz | |
| 2,669,036 A | 2/1954 | Isreal | |
| D172,251 S | 5/1954 | Salmeri | |
| 2,773,317 A | 12/1956 | Helle | |
| 2,981,010 A | 4/1961 | Aaskov | |
| 3,613,272 A | 10/1971 | Fukuoka | |
| 3,742,625 A | 7/1973 | Famolare | |
| 4,072,461 A | 2/1978 | Pirk | |
| 4,132,016 A | 1/1979 | Vaccari | |
| 4,177,583 A | 12/1979 | Chapman | |
| 4,290,212 A | 9/1981 | Matsson | |
| 4,400,894 A | 8/1983 | Ehrlich | |
| 4,535,554 A | 8/1985 | De Obaldia | |
| 4,573,457 A | 3/1986 | Parks | |
| 4,706,316 A * | 11/1987 | Tanzi | 12/142 T |
| 4,742,625 A | 5/1988 | Sydor et al. | |
| 4,924,606 A | 5/1990 | Montgomery et al. | |
| 5,111,597 A | 5/1992 | Hansen et al. | |
| 5,285,583 A | 2/1994 | Aleven et al. | |
| 5,315,767 A | 5/1994 | Bradbury | |
| 5,331,751 A | 7/1994 | Harwood | |
| 5,384,973 A * | 1/1995 | Lyden | 36/25 R |
| 5,469,638 A | 11/1995 | Crawford, III | |
| 5,481,814 A | 1/1996 | Spencer | |
| D373,674 S | 9/1996 | Dolinsky | |
| 5,836,090 A | 11/1998 | Smith | |
| 5,862,614 A | 1/1999 | Koh | |
| 5,901,394 A | 5/1999 | Greenawalt | |
| D412,777 S | 8/1999 | Norton et al. | |
| D425,292 S | 5/2000 | Matis | |
| 6,065,230 A | 5/2000 | James | |
| 6,082,023 A * | 7/2000 | Dalton | 36/28 |
| 6,122,845 A | 9/2000 | Menghi et al. | |
| D440,034 S | 4/2001 | Matis | |
| 6,237,249 B1 | 5/2001 | Aguerre | |
| 6,298,583 B1 | 10/2001 | Allen | |
| 6,493,965 B1 | 12/2002 | Bathum | |
| 7,290,356 B2 * | 11/2007 | Fuerst | 36/77 R |
| 2002/0148142 A1 | 10/2002 | Oorei et al. | |
| 2004/0128863 A1 | 7/2004 | Hong et al. | |
| 2004/0194342 A1 | 10/2004 | Steinberg | |
| 2005/0060914 A1 | 3/2005 | Fuerst | |

FOREIGN PATENT DOCUMENTS

| | | |
|---|---|---|
| DE | 20107343 | 7/2001 |
| EP | 1459874 | 9/2004 |
| FR | 718801 | 1/1932 |
| FR | 2478442 | 9/1981 |
| GB | 138623 | 7/1920 |

\* cited by examiner

FOOTWEAR WITH MULTI-PIECE MIDSOLE

CROSS-REFERENCE TO RELATED PATENT APPLICATIONS

The present application is a divisional of U.S. patent application Ser. No. 11/148,701, filed Jun. 8, 2005, which claims priority to U.S. Provisional Application Serial No. 60/578,328, filed Jun. 8, 2004, the disclosures of which are incorporated herein by reference in their entirety.

BACKGROUND OF THE INVENTION

Shoes and sandals typically include an upper joined to a sole assembly. The sole assembly commonly includes an outsole, a midsole and an insole. While in some cases these components can be cut out of sheet stocks of various types, it is becoming ever more popular particularly in the cases of sport shoes, sport sandals, running shoes and the like to mold the various sole components and join them together using glues, heat and/or pressure. We have recently introduced a line of sports shoes and sandals which can be characterized as having a substantial degree of covering over the wearer's toes. In the case of sandals, this provides an unprecedented degree of protection to the wearer's feet and especially toes. It also imparts a distinctive and attractive design element to the footwear and can contribute to durability.

This toe covering can be achieved by integrally molding the toe protection into the outsole such that when the outsole is incorporated into the footwear the desired toe protection is provided. This approach can be seen in U.S. Pat. Nos. D 498,575 and D 498,523, issued from U.S. Ser. Nos. 29/173,098 and 29/173,099, filed on Dec. 20, 2002. As set forth herein, we have now found that the toe protection can also be provided by the combination of a toe cap integrally molded into the midsole and an upward-sweeping toe protection area integrally molded into the outsole to correspond to and cover at least a portion of the integrally-molded toe cap on the midsole.

This sort of midsole construction presents a difficulty in manufacturing. The materials employed in midsoles are most commonly foamed materials that are somewhat flexible and resilient. However, the midsole does serve an important role in defining the overall shape and flexibility of the final footwear product. In this role the midsole needs to have a substantial degree of structure and rigidity. This needs to be accomplished with a molded midsole as molding is the most cost effective and accepted way to form a midsole. This means that the shape in which the molded midsole is incorporated into the footwear product should correspond closely to the shape into which it has been molded so that this shape can be maintained during manufacture and into the final footwear product.

When molding a midsole having a substantial toe covering or cap a special problem occurs. A conventional molding process can not be easily used. For a conventional midsole having a bottom surface and a top surface and optional sidewalls that are either vertical or gradually outwardly flaring but not having a toe cap a simple two piece injection mold can be used with the female section of the mold defining the bottom surface and the outside surface of any side walls and the male part of the mold defining the top or inner surface of the midsole and the inside surface of any side walls. This mold can be conventionally closed to make the midsole and when opened after injecting the midsole foam, permitting the molded part to be simply lifted out. The presence of the integrally-molded toe cap changes this considerably as the overlaying toe piece makes it difficult if not impossible to form the midsole with a conventional two piece mold as the female mold section would essentially surround the outer portion in the toe region with the male section present within the toe section and this would prevent the direct separation of the two mold halves and simple removal of the product midsole.

The prior art includes the following United States Patents and Applications which describe multi-piece midsoles: U.S. Pat. Nos. 130,162; 168,051; 3,444,572; 4,676,010; 6,405,456; 6,516,540; and 6,715,218 and Applications No. 2002/0184793 and 2003/0172458.

STATEMENT OF THE INVENTION

We have now discovered a new design and manner of construction for a midsole with a toe cap integrally molded thereto. This new design and manner of construction gives rise to a new manner of making a molded midsole, as well. This design and manner of construction, while somewhat more complicated than conventional midsoles and methods of manufacture, does greatly simplify the manufacture of a molded midsole with an integral overlying or overextending toe cap.

In one aspect this invention provides an article of footwear having a heel and a toe and a longitudinal axis extending there between and comprising a molded midsole and a molded outsole. In this article of footwear the midsole is formed in multiple separate sections including a forefoot-supporting section having an integrally molded toe cap and a midfoot- and heel-supporting section. These two separately molded sections are affixed to one another at a seam, i.e. joint, intersecting the axis. The outsole extends over both sections of the midsole and itself has an integrally-molded section extending upwards over at least a portion of the midsole toe cap. The outsole conceals at least the majority of the joint in the midsole.

In another aspect this invention provides a molded midsole for an article of footwear having a heel and a toe and an axis extending there between. This midsole is molded in multiple separate sections including a forefoot-supporting section that terminates in an integrally-molded toe cap and a midfoot- and heel-supporting section. These two separate sections are affixed to one another at a seam, i.e. joint, intersecting the axis.

In a yet additional aspect this invention provides a method for making an article of footwear having a molded outsole and a molded midsole extending from a heel region through a midfoot-supporting section through a forefoot- and toe-supporting section and terminating at the toe end in an integrally-molded toe cap. A longitudinal axis runs from the heel of the article of footwear to the toe. The outsole also has an integrally-molded toe section extending upwards over at least a portion of the midsole toe cap. In this process of making, the midsole is molded in more than one part with the toe-supporting region and midsole toe cap being molded as one part and the remainder of the midsole typically molded as a second part. These separately-molded parts are joined together at a seam crossing the axis. This joining is carried out with adhesive or by the use of heat and pressure fusing. In one embodiment of this process the two or more sections of the midsole are joined together before incorporating the midsole into the article of footwear. In another embodiment the individual midsole sections are separately incorporated into the footwear article and joined to one another in place. Thereafter the outsole is affixed to the shoe positioned so as to conceal at least the majority of the one or more seams between the parts making up the midsole.

BRIEF DESCRIPTION OF THE DRAWINGS

This invention will be further described with reference being made to the accompanying drawings in which.

DETAILED DESCRIPTION OF THE INVENTION

Figure 1:
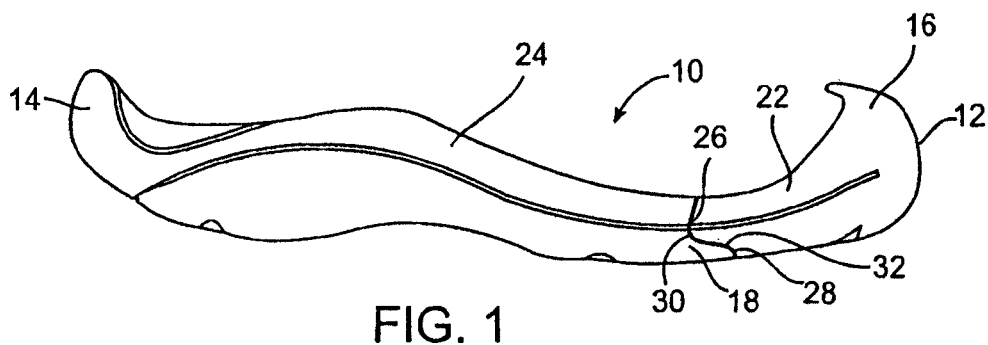
FIG. 1 is an outside elevation view of a multiple piece midsole of the invention for a right foot article of footwear.
Figure 2:
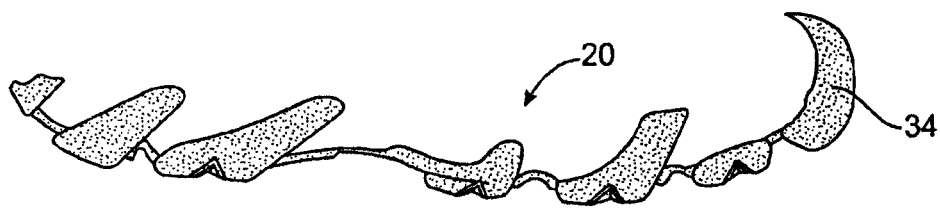
FIG. 2 is a similar outside elevation view of an outsole used in conjunction with the midsole depicted in FIG. 1.
Figure 3:
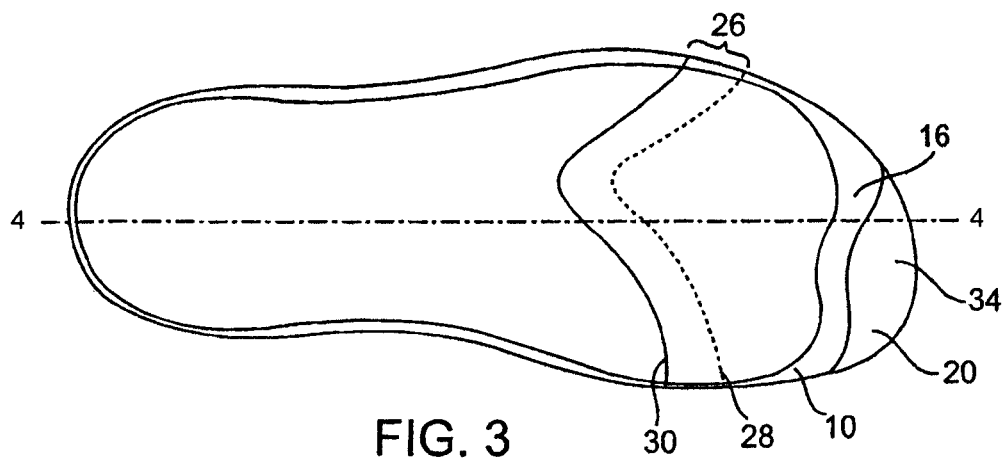
FIG. 3 is a top plan view of a midsole of the invention in combination with an outsole for a left foot article of footwear having a heel to toe longitudinal axis along line a-a.

The present invention provides an improved construction for articles of foot wear such as sandals, and shoes such as sport and casual shoes. As shown in FIGS. 1 through 4, these articles of footwear include a midsole 10 and an outsole 20. The midsole has a toe end or forefoot-supporting end 12 and a rear or heel-supporting end 14. A longitudinal axis extends between these ends along line a-a. The toe end of midsole 10 is characterized by having an integrally-molded toe cap 16 which is continuous with the base 18 of midsole 10 and which extends upward and backward, enclosing and covering at least the tips of at least some of the wearer's toes. The midsole is made in more than one piece. As shown, it includes a front or forefoot-supporting piece 22 and a rear foot-supporting piece 24 joined together at joint or seam 26. Seam 26 is shown as a stepped seam with relatively vertical sections 28 and 30 adjacent to relatively more horizontal section 32. The purpose of this stepping is to allow the two sections to interact and latch to one another to add strength to the joint 26. As show in FIG. 3, it is generally preferred if the joint 26 cuts across longitudinal axis a-a in a plurality of non aligned segments such as a plurality of curved segments and/or a plurality of more linear segments so as to not present a single straight line. In FIG. 3, the segmented joint 26 can be seen as a curved line curving around the areas where the ball of the wearer's foot would commonly be located during use, that is the area adjacent to the wearer's lateral arch.

Figure 4:
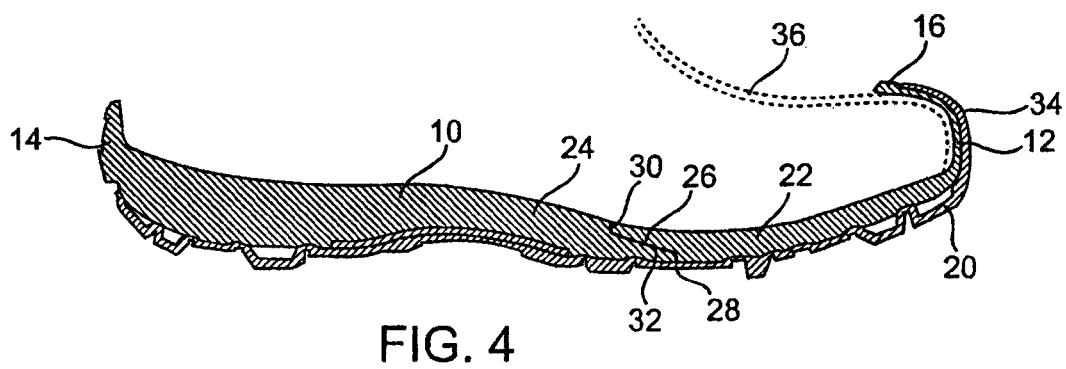
FIG. 4 is a cross-sectional view of the midsole and outsole of FIG. 3 taken along line 4-4 of FIG. 3.

As shown in FIG. 4, the segmented (non-straight) joint offers the additional advantage to permitting the joint to traverse the sole of the article of footwear at least in part in areas away from the maximum flex of the midsole when the article of footwear is being worn. This increases the durability of the midsole and leads to a more continuous and more comfortable flex of the overall sole and its associated article of footwear.

Figure 8:
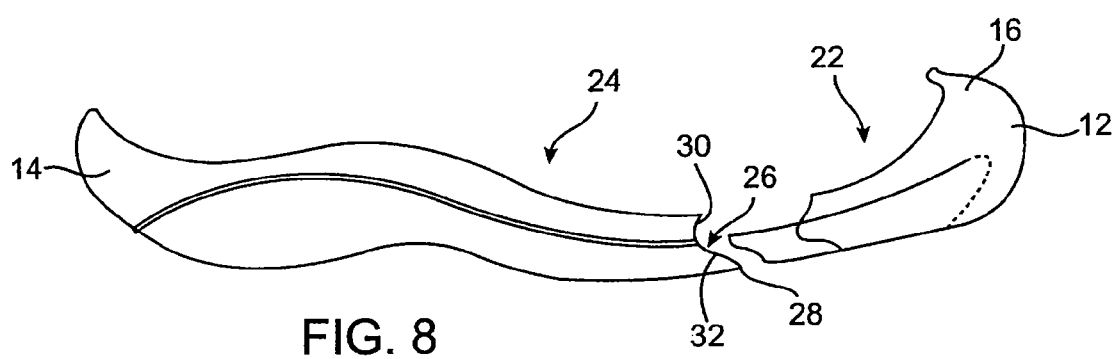
FIG. 8 is an exploded view of the multi-piece midsole shown in FIG. 1.

FIG. 8 shows the two pieces 22 and 24 before they are joined together and further illustrates the step seam 26 with edges of i.e. vertical sections 28 and 30 and relatively more horizontal section 32.

Outsole 20 has an integrally-molded toe piece 34 as well. Toe piece 34 covers at least a portion of midsole toe piece or toe cap 16. The upper of the shoe or sandal is not shown directly but in FIG. 4 is depicted in phantom as 36 to show how it is affixed to the midsole 10 in the area of the toe cap 16 in one form of construction.

Figure 5:
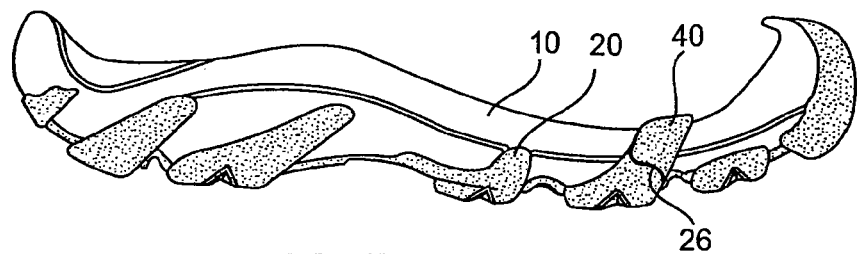
FIG. 5 is an outside elevation view of an outsole and a midsole of the present invention.
Figure 6:
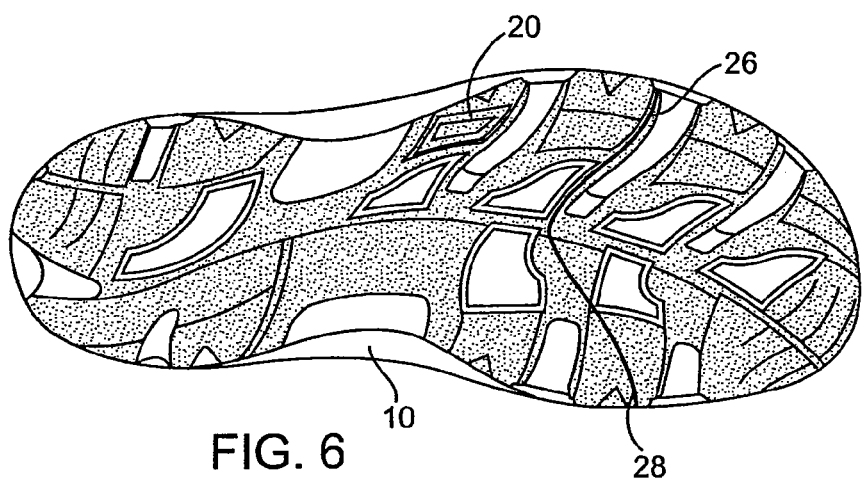
FIG. 6 is a bottom plan view of the outsole and midsole depicted in FIG. 5.
Figure 7:
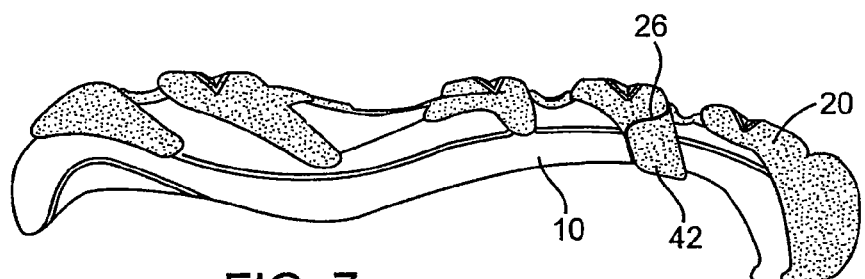
FIG. 7 is an inverted inside elevation view f the outsole and midsole of FIG. 5.

Outsole 20 is designed to conceal at least a majority of the outside edge 28 and the sides 28, 30 and 32 of seam 26. This can be seen in the cross-section provided in FIG. 4. It can also be seen in FIGS. 5, 6, and 7 where the position of the seam 26 is shown by a dark line. It will be appreciated that the seam is substantially covered by outsole 20 including upwardly extending wings 40 and 42 which extend up the side of the midsole in the general area of the edge 28, 30 and 32 of the joint or seam 26. In FIGS. 5, 6 and 7 the outsole 20 is shown with stippling to distinguish it from the midsole which is shown without stippling.

While the footwear construction of this invention has been depicted with a two piece midsole. It will be appreciated that the same advantages would be realized if the midsole was divided into even additional segments. It is our intention that this patent should cover these embodiments but it is generally preferred to have a construction in which the midsole is formed of two joined pieces as just described.

A substantial advantage or the footwear construction of this invention is the ease of molding of the midsole 10. As can be in FIG. 8, the forefoot section 22 can be molded in a conventional two piece injection mold. So can the rear section 24. If these two sections were combined for molding in a single piece, a much more complicated and expensive molding process would be required to form the cavity under the toe cap 16.

The materials employed in the present footwear are all relatively conventional. The midsole is made from a rubber or plastic material that is typically foamed for light weight. In many cases the two midsole sections are made of the same foamed rubber or plastic but it is also possible to use different materials for each end so as to vary the properties from the heel to the forefoot and thus to achieve better stability, better cushioning or the like. Thus, for example, a midsole could be constructed with a more rigid foam in the rear (heel) and midfoot section and a less rigid, more cushioning forefoot section. This construction would provide a shoe with better heel stability and pronation control. Conversely a shoe having an insole with a softer (less rigid) heel and midfoot section would provide a shoe with better cushioning.

Representative midsole materials are foamed urethanes or foamed EVAs such as phylon or the like. The multiple molded pieces of the midsole can be joined together with an adhesive such as a cyanoacrylate adhesive or a urethane adhesive or a bonding solvent or the like. Heat and pressure can be applied to assist in the bonding and joining process.

The outsole is formed of a rubber or plastic material that is commonly chosen for its combination of flexibility and durability. Rubbers, including both natural and synthetic rubbers, can be used as can plastics such as urethanes and higher density EVA materials.

What is claimed is:

1. An article of footwear having a heel and a toe and an axis extending there between and comprising an upper, a multi-part midsole and an outsole,
    a. the midsole being made of a flexible, partially compressible molded material and having interconnected first and second sections, the first section having an integrally-molded toe cap attached to and extending over at least a portion of the upper, and b. the outsole extending over the midsole and itself having an integrally-molded toe section extending upwards over at least a portion of the midsole toe cap, wherein the midsole has a joint between the first and second sections and the joint is a stepped joint with the step positioning the first and second sections relative to one another.

2. The article of footwear of claim 1 for accommodating a wearer's foot and protecting the wearer's toes against impact, the outsole adhered to the midsole, the first section of the midsole being a forefoot-supporting section located and configured to support at least the wearer's toes and at its toe end extending beyond, in front of and over the tips of the wearer's toes thereby creating the integrally-molded midsole toe cap, and the outsole located and configured to support the forefoot-supporting section of the midsole and to provide the integrally-molded outsole toe cap extending beyond, in front of and over at least a portion of the toe end of the integrally-molded midsole toe cap.

3. The article of footwear of claim 2 wherein the midsole and the outsole are affixed to one another.

4. The article of footwear of claim 3 wherein the midsole toe cap and the outsole toe cap are affixed to one another.

5. The article of footwear of claim 1 wherein the first section of the midsole is a forefoot-supporting section and the second section of the midsole is a midfoot- and heel-supporting section made of foamed material.

6. The article of footwear of claim 5 wherein the midfoot- and heel-supporting section foamed material differs from the forefoot section foamed material.

7. The article of footwear of claim 1 wherein the joint has at least two connected segments.

8. A method for making a multi-part midsole for an article of footwear for a wearer, the article of footwear having a heel and a toe and an axis extending there between and further comprising an upper and an outsole, the midsole being made of a flexible, partially compressible molded material and having interconnected first and second sections, the midsole extending from the wearer's heel to the wearer's toes and characterized by an integrally-molded toe cap of the first section attached to and extending over at least a portion of the upper and over the toes of the wearer, the outsole extending over the midsole and itself having an integrally-molded toe section extending upwards over at least a portion of the midsole toe cap, wherein the first section is a forefoot-supporting section and the second section is a rear foot- and heel-supporting section, comprising:

molding the forefoot-supporting section having the integrally-molded toe cap in a two piece mold;

molding the rear foot- and heel-supporting section in a two piece mold; and joining the forefoot-supporting section and the rear foot- and heel-supporting section at a joint into a unitary midsole, wherein the joint is between the first and second sections and is a stepped joint with the step positioning the first and second sections relative to one another.

9. The method of claim 8 wherein the stepped joint is a segmented joint.

10. The method of claim 9 comprising the additional step of affixing to the unitary midsole the outsole, said outsole configured to conceal at least a portion of the joint.

\* \* \* \* \*